(12) United States Patent
Wang et al.

(10) Patent No.: US 10,718,144 B2
(45) Date of Patent: Jul. 21, 2020

(54) DAMPER

(71) Applicant: Xiangji Wang, Xiamen (CN)

(72) Inventors: Xiangji Wang, Xiamen (CN); Yaohui Lin, Xiamen (CN); Yuanhuai Zhang, Xiamen (CN)

(73) Assignee: Xianji Wang, Xiamen, Fujian (CN)

( * ) Notice: Subject to any disclaimer, the term of this patent is extended or adjusted under 35 U.S.C. 154(b) by 207 days.

(21) Appl. No.: 15/767,025

(22) PCT Filed: Jan. 16, 2017

(86) PCT No.: PCT/CN2017/071226
§ 371 (c)(1),
(2) Date: Apr. 9, 2018

(87) PCT Pub. No.: WO2017/128971
PCT Pub. Date: Aug. 3, 2017

(65) Prior Publication Data
US 2018/0298663 A1    Oct. 18, 2018

(30) Foreign Application Priority Data

Jan. 29, 2016 (CN) .......................... 2016 1 0063943

(51) Int. Cl.
| E05F 3/02 | (2006.01) |
| E05F 3/04 | (2006.01) |
| A47K 13/10 | (2006.01) |
| E05F 3/14 | (2006.01) |
| F16F 9/516 | (2006.01) |
| A47K 13/12 | (2006.01) |

(52) U.S. Cl.
CPC ................ *E05F 3/02* (2013.01); *A47K 13/10* (2013.01); *E05F 3/04* (2013.01); *E05F 3/14* (2013.01); *F16F 9/516* (2013.01); *A47K 13/12* (2013.01); *E05Y 2201/254* (2013.01); *E05Y 2201/266* (2013.01); *E05Y 2900/614* (2013.01)

(58) Field of Classification Search
CPC .... A47K 13/10; E05F 3/02; E05F 3/04; E05F 3/14; F16F 9/516
USPC .......................................................... 4/248
See application file for complete search history.

(56) References Cited

U.S. PATENT DOCUMENTS

| 5,419,013 A | 5/1995 | Hsiao |
| 6,464,052 B1 | 10/2002 | Hsiao |

FOREIGN PATENT DOCUMENTS

| CN | 201033049 Y | 3/2008 |
| CN | 201899438 U | 7/2011 |
| CN | 205531896 U | 8/2016 |

*Primary Examiner* — Christine J Skubinna
(74) *Attorney, Agent, or Firm* — Cooper Legal Group, LLC

(57) ABSTRACT

A damper has a shell with a cavity. A rotating shaft is rotatably inserted into the cavity of the shell, the portion of the rotating shaft located in the cavity is provided with external thread; a guiding sleeve with internal thread can move along axially reciprocatingly to attach to the shell cavity, and the internal thread and the male thread of the rotating shaft are screwed together; A guiding structure is provided in the shell cavity. The guiding sleeve is engaged or disengaged with the guiding structure by axial movement, and when the two are disengaged, the guiding sleeve can rotate with the rotating shaft. The guiding sleeve is provided with a one-way valve passage. The one-way valve passage opens when the guiding sleeve is axially disengaged with the guiding structure. When the guiding sleeve moves axially in the reverse direction, the one-way valve passage is closed.

21 Claims, 6 Drawing Sheets

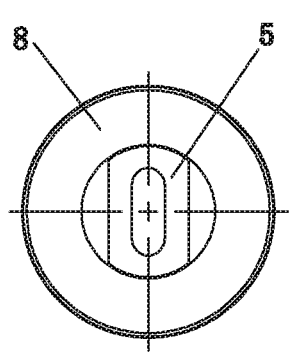
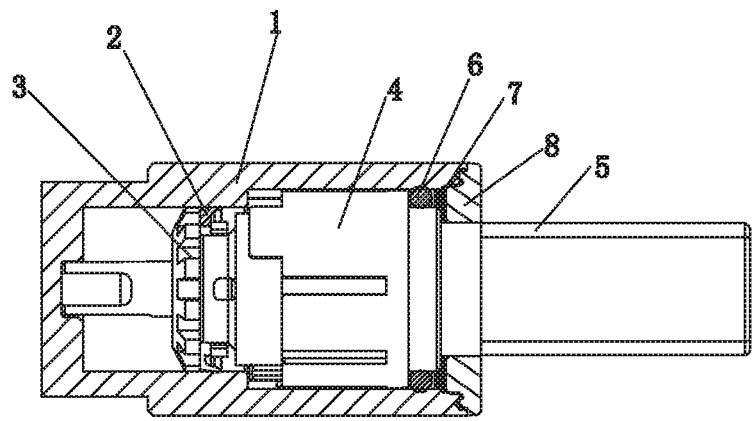
FIG. 5-1　　　　　　　　FIG. 5-2
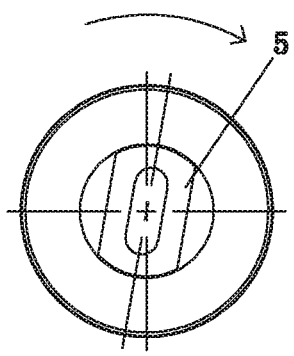
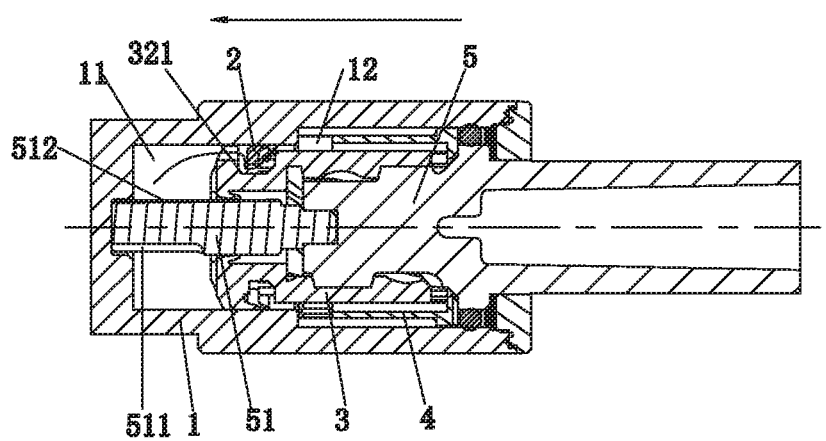
FIG. 6-1　　　　　　　　FIG. 6-2

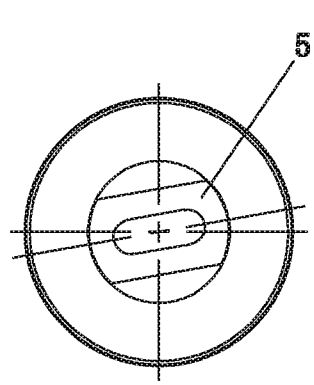
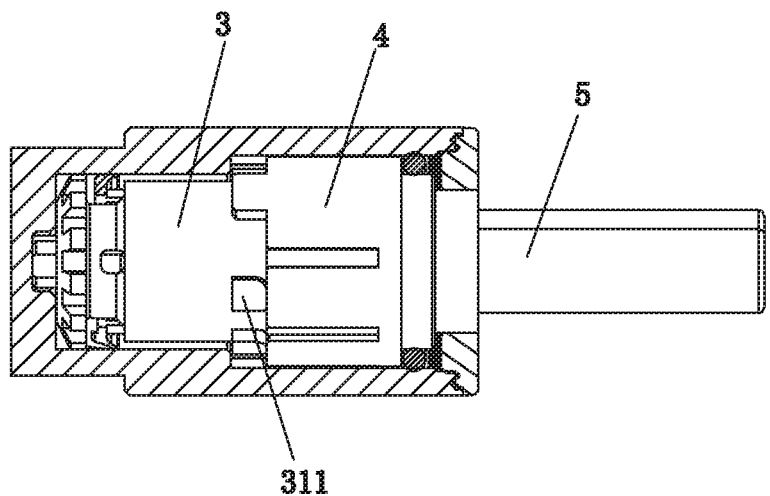
FIG. 7-1  FIG. 7-2
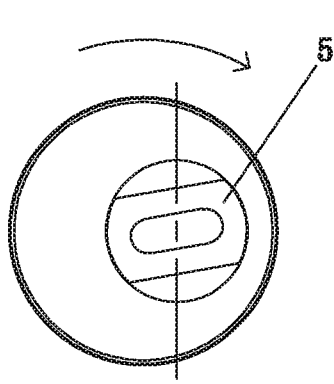
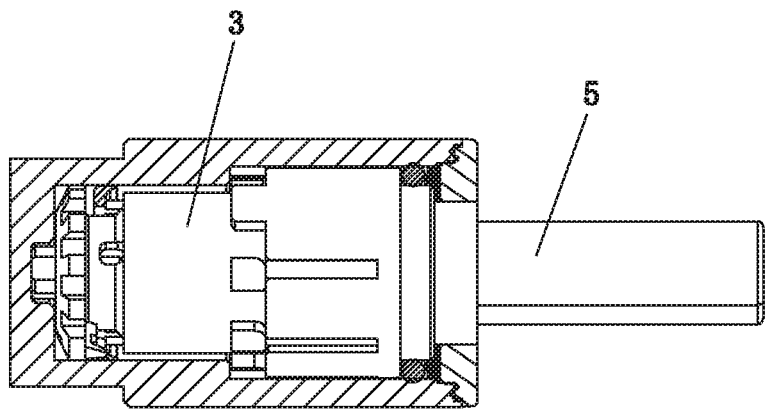
FIG. 8-1  FIG. 8-2

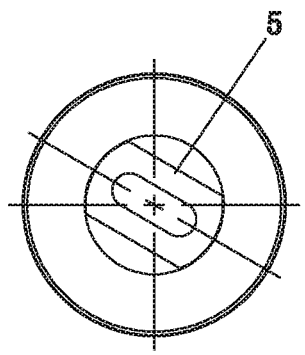 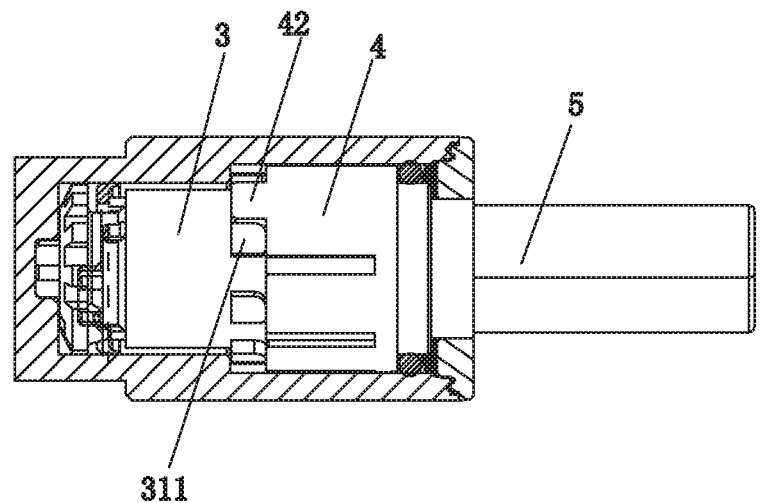
FIG. 9-1    FIG. 9-2
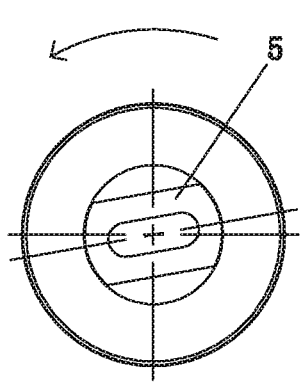 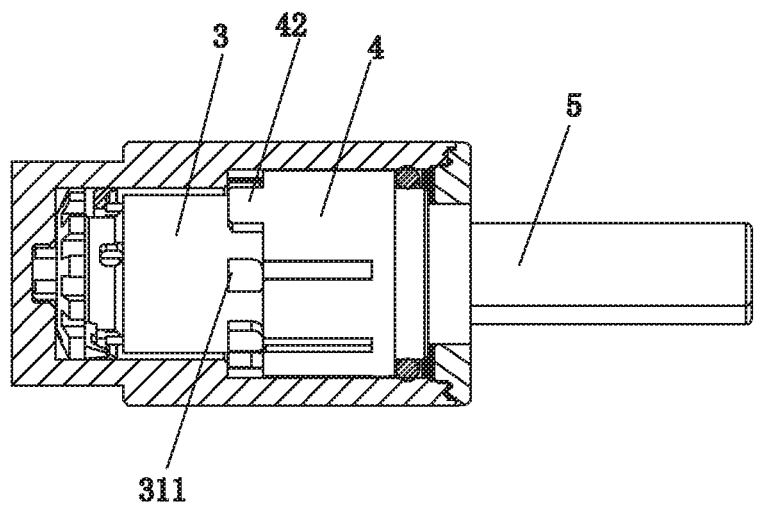
FIG. 10-1    FIG. 10-2

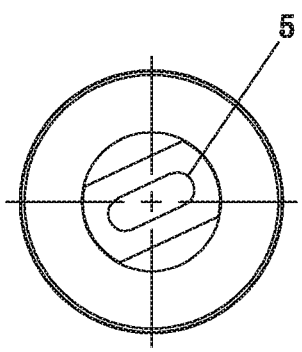
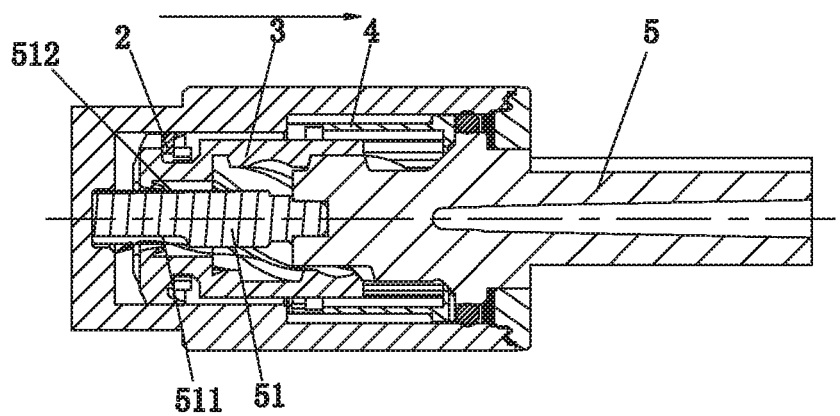
FIG. 11-1          FIG. 11-2
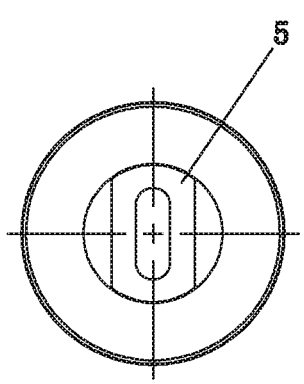
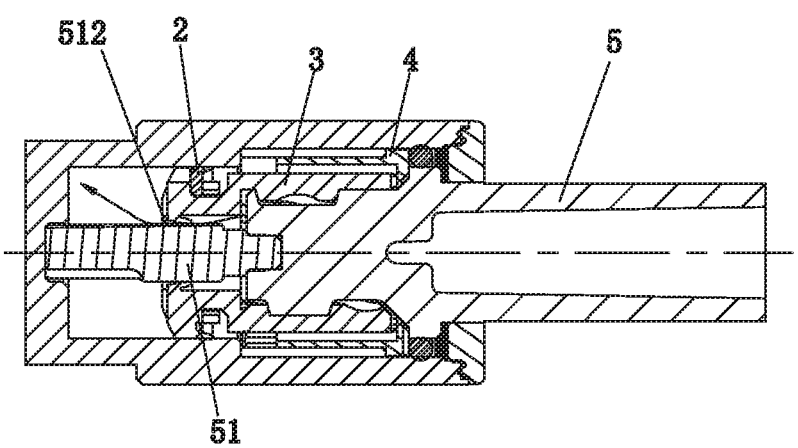
FIG. 12-1          FIG. 12-2

DAMPER

TECHNICAL FIELD

The present invention relates to a rotating rotating shaft, and more particularly to a damper capable of slowly falling after a rapid falling of a pivoting member.

BACKGROUND TECHNIQUE

Toilet is closely related to people's lives, people use the toilet, it is most frequent that the toilet lid is opened or closed. In the traditional toilet, the toilet lid and the toilet seat are mostly connected through an unhindered hinge, the advantage is that the toilet lid can be flipped quickly, the disadvantage is that when the toilet lid closed the toilet lid easily collide with the toilet seat, which not only exist noise pollution, but also the toilet lids are also prone to wear. For this reason, the damper is generally used to connect the toilet lid and the toilet seat to make the toilet lid closure can be landed slowly. However, the damper used in the prior art has a long damping time to close the toilet lid, the closing process is too slow, it is difficult to meet the user's needs. In particular, for some lighter toilet lid, due to the damper damping force is large, the toilet lid is more difficult to land.

CONTENT OF THE INVENTION

The present invention provides a damper that overcomes the deficiencies of the prior art damper.

The technical solution adopted by the present invention for solving the technical problem is as follows:

A damper for pivotally connecting a pivoting member to a fixed seat, including: A shell for connecting to one of the pivoting member and the fixed seat, the shell has a cavity containing some viscous fluid medium;

A rotating shaft for connecting to the pivoting member and the fixed seat, rotatably inserted into the cavity of the shell, the portion of the rotating shaft located in the cavity is provided with an external thread;

A guiding sleeve, which is provided with an internal thread, the guiding sleeve can be axially reciprocatingly attached in the cavity of the shell, and its internal thread is screwed with the external thread of the rotating shaft; the cavity of the shell is also provided with a guiding structure for guiding the axial movement of the guiding sleeve, the guiding sleeve meshes with or disengaged from the guiding structure through the axial movement, and when the two are disengaged, the guiding sleeve can rotate with the rotating shaft.

The guiding sleeve is provided with a one-way valve passage, when the guiding sleeve is axially moved to transit from been engaged to been disengaged with the guiding structure, the one-way valve passage is open for passage of the fluid medium. When the guiding sleeve is axially moved to transit from been disengaged to been engaged with the guiding structure, the one-way valve is closed, and the fluid medium is forced to pass through any one or more of the gap between the rotating shaft and the guiding sleeve, the gap between the guiding sleeve and the shell, and the damping passage provided on the rotating shaft.

Further, the guiding sleeve includes, in the axial direction thereof, a guiding sleeve head and a guiding sleeve body provided within the internal thread, the guiding sleeve head is provided with the one-way valve passage.

Further, the one-way valve passage includes an annular groove provided on the outer periphery of the guiding sleeve head, and a set of one-way valve ring in the annular groove and can move axially in the annular groove, the outer periphery of the one-way valve ring and the inner wall of the cavity of the shell is softly sealed, after the one-way valve passage is closed, the fluid medium is forced to pass through the gap between the rotating rotating shaft and the guiding sleeve head and/or the damping passage provided on the rotating shaft.

Further, the portion of the rotating rotating shaft located in the cavity includes a threaded section provided with an external thread and a first rotating shaft section, and both are on the same axis, after the one-way valve passage is closed, the fluid medium is forced to pass through from the gap between the first rotating shaft section and the guiding sleeve and/or the damping passage provided on the rotating shaft section.

Further, the damping passage includes at least two oil grooves, and the at least two oil grooves are respectively disposed on the side wall along the axial direction of the rotation rotating shaft.

After the one-way valve passage is closed, the fluid medium is forced to pass through each of the oil grooves first, and then through one part of the oil groove, or, the damping passage is one and the cross-sectional area is gradually changed, after the one-way valve passage is closed, the fluid medium is forced to passes through the part of cross-sectional area having a large cross-sectional area and then passes through the part of the cross-sectional area having a small cross-sectional area.

Further, the lengths of the at least two oil grooves are not equal, and the cross-sectional area of the oil groove having a longer length is smaller than the cross-sectional area of the oil groove having a shorter length, after the one-way valve is closed, the fluid medium is forced to pass through each of the oil groove first, and then pass the longer oil groove.

Further, at least one rotation stopping portion is provided in the cavity of the shell, and when the guiding sleeve rotates with the rotation axis to a preset angle, the rotation of the guiding sleeve is limited by this rotation stopping portion. Further, a fixing sleeve is fixedly installed in the cavity of the shell, and the guiding sleeve and the fixing sleeve are mated with each other inside and outside. The guiding structure comprises a plurality of first convex portions arranged at intervals around an inner wall of the fixing sleeve, the outer walls of the guiding sleeve are circumferentially disposed with a plurality of second convex portions at intervals respectively, the first convex portion and the second convex portion are engaged or disengaged; the rotation stopping portion is provided on the fixing sleeve, when the guiding sleeve rotates to a preset angle with the rotation rotating shaft, the rotation stopping portion is abutted with the second convex portion of the guiding sleeve to limit the rotation of the guiding sleeve.

Further, an end of the guiding head is arranged at intervals with a plurality of oil gaps or oil hole passing axially through the annular groove.

Further, the first rotating shaft section and the threaded section are integrally formed or coaxially fixed.

Further, one end of the shell is closed, and the other end is provided with an axial opening communicating with the cavity, another end of the shell is fixedly connected with the end cap for sealing the axial opening, the rotating shaft further comprises a second rotating shaft section, the thread section is located in between the second rotating shaft section and the first rotating shaft section, the free end of the rotating shaft section extends out of the shell through the end cap for connection to the pivoting member and the fixed seat.

Further, a seal ring is disposed between the second rotating shaft portion of the rotating rotating shaft and the cavity of the shell.

Compared with the prior art, the present invention has the following beneficial effects:

1. In the invention, the shell, the rotating rotating shaft and the guiding sleeve are designed so that when the pivoting member is closed, the pivoting member rapidly falls off firstly and then falls off slowly, and the fall off rapidly makes the guiding sleeve rotate without damping with the rotating rotating shaft to drive the pivoting member to descend rapidly. The fall off slowly makes the guiding sleeve move axially with the rotation of the rotating rotating shaft and the fluid medium is forced to pass through one or more of the gap between the rotating rotating shaft and the guiding sleeve, the gap between the guiding sleeve and the shell and the damping passage provided on the rotating rotating shaft. So that the pivoting member is driven to slowly descend. Therefore, the invention can shorten the closing time of the pivoting member as a whole, meet the user's requirement of use, solve the problem that the lighter weight toilet lid does not fall easily, and avoid the collision with the fixed seat when the pivoting member is closed.

2, The invention can make more effective use of the space and utilizes the relationship of the engagement and disengagement of the guiding sleeve and the guiding structure to apply the entire travel of the guiding sleeve to the landing stage of the pivoting member, so that the effective travel of the guiding sleeve is longer, the work distance is longer, the force becomes smaller, making the entire slow down process easier to control.

3. In the present invention, the damping passage is preferably designed so that the present invention can further promote the pivoting member descends rapidly firstly and then descends slowly when the pivoting member is at the slow falling stage to further shorten the closing time of the pivoting member.

4, the present invention also has a larger pivot opening angle, work quietly, can withstand greater weight toilet lid and so on.

The present invention will be further described in detail below with reference to the accompanying drawings and embodiments. However, a damper according to the present invention is not limited to the embodiment.

BRIEF DESCRIPTION OF THE DRAWINGS

FIG. 5-1 is a right side view of the present invention when the toilet lid is closed;

FIG. 5-2 is a schematic cross-sectional view of the present invention when the toilet lid is closed;

FIG. 6-1 is a schematic diagram (right view) of the present invention when the toilet lid is turned upward to a predetermined angle;

FIG. 6-2 is a schematic diagram (cross-sectional view) of the present invention when the toilet lid is turned upward to a predetermined angle;

FIG. 7-1 is a right side view of the present invention when the toilet lid is opened to a predetermined angle;

FIG. 7-2 is a schematic sectional view of the present invention when the toilet lid is opened to a predetermined angle;

FIG. 8-1 is a schematic diagram (right view) of the present invention when the toilet lid continues to be turned upwards;

FIG. 8-2 is a schematic diagram (cross-sectional view) of the present invention when the toilet lid is in the process of continuing to be pulled upward;

FIG. 9-1 is a right side view of the present invention when the toilet lid is fully open;

FIG. 9-2 is a schematic sectional view of the present invention when the toilet lid is fully opened;

FIG. 10-1 is a schematic diagram (right view) of the present invention during the downward turning of the toilet lid to the predetermined angle;

FIG. 10-2 is a schematic diagram (cross-sectional view) of the present invention during the downward turning of the toilet lid to the predetermined angle;

FIG. 11-1 is the first schematic view (right view) of the present invention during the state that the toilet lid continues to be turned downwards;

FIG. 11-2 is the first schematic view (cross-sectional view) of the present invention in the state that the toilet lid continues to be turned downwards;

FIG. 12-1 is the second schematic diagram II (right view) of the present invention in a state in which the toilet lid continues to be turned downwards;

FIG. 12-2 is the second schematic diagram (cross-sectional view) of the present invention during the further downward turning of the toilet lid.

DETAILED DESCRIPTION

Figure 1:
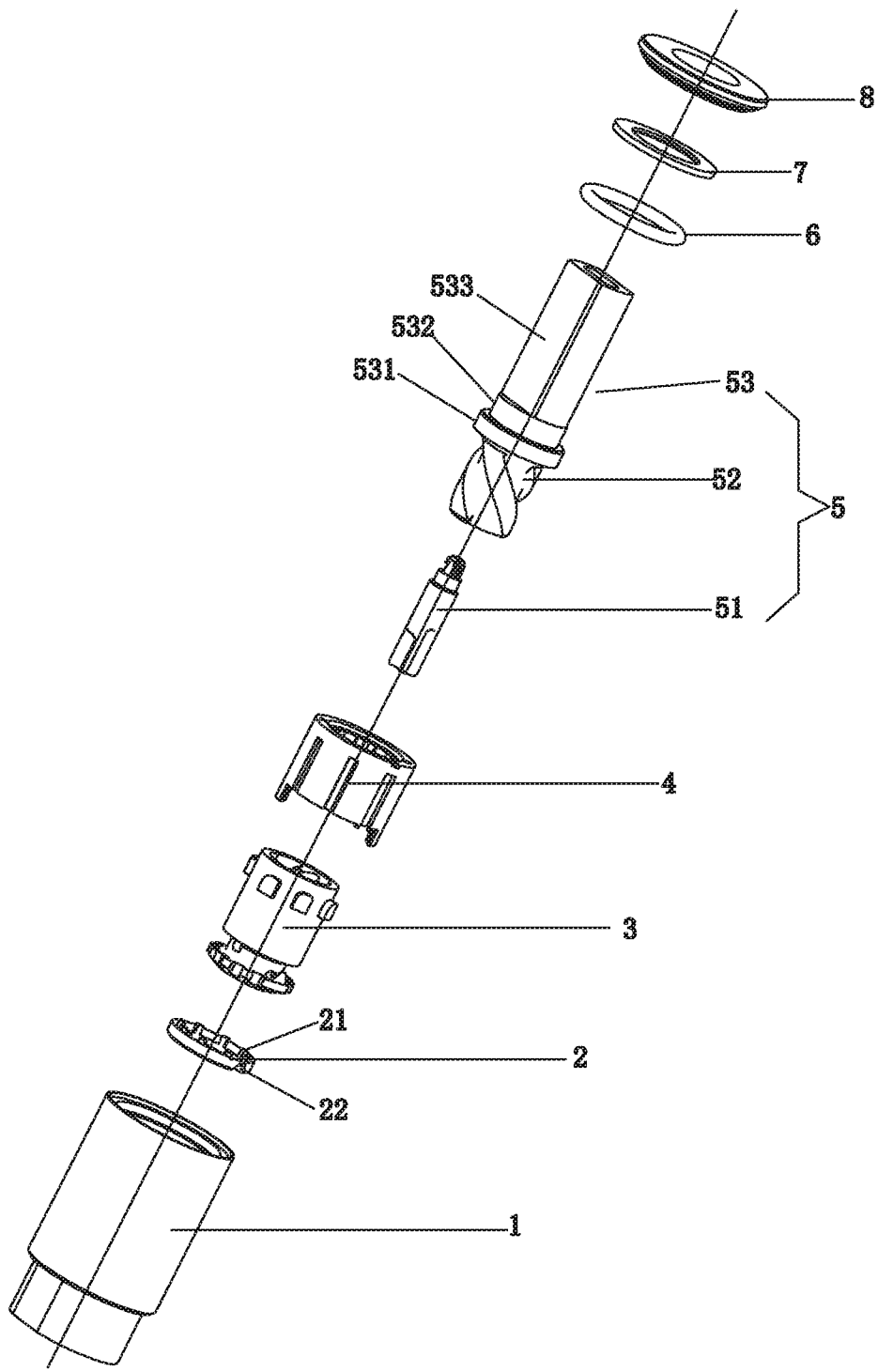
FIG. 1 is a schematic exploded view of the present invention.

In the embodiment, as shown in FIG. 1 to FIG. 4, the damper of the present invention is used for pivotally connecting a pivoting member to a fixed seat. In this embodiment, the pivoting member is specifically a toilet lid, and the fixed seat is specifically a toilet seat. The damping of the present invention including:

A shell 1 for attaching to a toilet seat, the shell 1 has a cavity containing viscous fluid medium, the fluid medium is specifically damping oil;

A rotating shaft 5 for connection to the toilet lid, which is rotatably inserted into the cavity of the shell 1, the portion of the rotating shaft 5 which is located in the cavity is provided with an external thread;

A guiding sleeve 3, which is provided with an internal thread, the guiding sleeve 3 can be axially reciprocatingly attached to the cavity of the shell 1, and the internal thread is screwed with the external thread of the rotating shaft 5; A guiding structure for guiding the axial movement of the guiding sleeve 3 is also provided in the cavity of the shell 1. The guiding sleeve 3 is engaged or disengaged with the guiding structure by axial movement and when the two are disengaged, the guiding sleeve 3 can be rotated with the rotating shaft 5;

The guiding sleeve 3 is provided with a one-way valve passage. The two sides of the one-way valve passage are respectively a first chamber 11 and a second chamber 12 formed by separating the cavity of the shell 1 along the axial direction of the rotating shaft 5. When the guiding sleeve 3 is moved axially to transit from been engaged to been disengaged with the guiding structure, the one-way valve passage is opened to allow passage of the fluid medium. The one-way valve passage is closed when the guiding sleeve 3 is moved axially from the disengagement to the engagement with the guiding structure, and the fluid medium is forced to pass through from any or more of the gap between the rotating shaft 5 and the guiding sleeve 3, the gap between the guiding sleeve 3 and the shell 1 and the damping passage provided on the shaft 5. That is, when there is a gap between the rotating shaft 5 and the guiding sleeve, the gap can be used for the fluid medium to pass through. When the gap between the guiding sleeve 3 and the shell 1 is provided, the gap can be used for passing the fluid medium. When the rotating shaft 5 is provided with a damping passage, the fluid medium can pass through the damping passage. The fluid medium passes through the corresponding gap and the damping passage when all three situations exist. When there are any two situations, for example, when there is a gap between the rotating shaft 5 and the guiding sleeve and the rotating shaft 5 is provided with a damping passage, the fluid medium passes through the corresponding gap and the damping passage, or when there is a gap between the rotating shaft 5 and the guiding sleeve and there is a gap between the guiding sleeve 3 and the shell 1, the fluid medium pass through both gaps, or when there is a gap between the guiding sleeve 3 and the shell 1, and the rotation shaft 5 is provided with a damping passage, the fluid medium passes through the corresponding gap and the damping passage.

In this embodiment, the guiding sleeve 3 includes, in the axial direction thereof, a guiding sleeve head 32 and a guiding sleeve body 31 provided with the internal thread. The guiding sleeve head 32 is provided with the one-way valve passage. The one-way valve passage includes an annular groove 321 provided on the outer periphery of the guiding sleeve head 32, and a one-way valve ring 2 in the annular groove 321 and axially movable in the annular groove 321.

The outer periphery of the valve ring 2 is flexibly and sealingly matched with the inner wall of the cavity of the shell 1 so that there is no gap for the fluid medium to pass through the gap between the guiding sleeve 3 and the shell 1. Therefore, when the one-way valve passage is closed, the fluid medium is forced to pass through from the gap between the rotating shaft 5 and the guiding sleeve 3 and the damping passage provided by the rotating shaft 5. When the one-way valve ring 2 is in contact with the wall of the out end of the annular groove 321, the one-way valve passage is opened. To prevent that when the one-way valve passage is opened, the one-way valve ring 2 is in contact with the other groove wall of the annular groove 321 to cause the one-way valve passage to close unexpectedly, and the one-way valve ring 2 may be provided with a isolating portion 21 (the annular groove 321 also can be provided with an isolating portion), the isolating portion 21 isolates the one-way valve ring 2 and the other groove wall of the annular groove 321 to keep them in a non-contact state. To prevent the one-way valve ring 2 from rotating relative to the guiding sleeve head 32, a limiting portion 323 can be disposed in the annular groove 321 and a corresponding engaging portion 22 can be disposed on the one-way valve ring 2. A plurality of oil hole 322 axially extending through the annular groove 321 are disposed at an outer periphery of the end of the guiding sleeve 32.

In this embodiment, the portion of the rotating rotating shaft 5 located in the cavity includes a threaded section 52 provided with an external thread and a first rotating shaft section 51.

Both are coaxially fixed, and the first rotating shaft section 51 is provided with the damping passage. The damping passage is two oil grooves 511, 512 specifically provided on the side of the first rotating shaft section 51, the two oil grooves 511, 512 are strip structure respectively arranged along the first rotating shaft section 51 in the axial direction, and the two oil groove 511, 512 are not equal in length, the cross-sectional area of the longer oil groove 512 is smaller than the cross-sectional area of the shorter oil groove 511, after the one-way valve passage is closed, the fluid medium is forced to flow from each oil groove through, then it passes through the longer oil groove 512.

In this embodiment, at least one rotation stopping portion 42 is further disposed in the cavity of the shell 1, and when the guiding sleeve 3 rotates with the rotation rotating shaft 5 to a predetermined angle, the rotation of the guiding sleeve 3 is restricted by the rotation stopping portion 42.

In this embodiment, the guiding structure is a plurality of first convex portions 41, and the outer wall of the guiding sleeve 3 is correspondingly provided with a plurality of second convex portions 311, the first convex portion 41 and the second convex portion 311 are engaged with or disengaged from each other.

In this embodiment, a fixing sleeve 4 is fixedly mounted in a cavity of the shell 1, the guiding sleeve 3 and the fixing sleeve 4 are in an internal-external mating relationship. The plurality of first convex portions 41 are circumferentially disposed on the inner wall of the fixing sleeve 4. Each of the plurality of second convex portions 311 is a rib, and is disposed around the outer wall of the guiding sleeve 3 (Specifically, the second convex portions 311 is provided on the outer wall of the guiding sleeve main body 31 of the guiding sleeve 3). The rotation stopping portion 42 is disposed on the fixing sleeve 4. When the guiding sleeve 3 rotates with the rotation axis 5 to a predetermined angle, the rotation stopping portion 42 abuts against the second convex portion 311 of the guiding sleeve 3 to restrict the rotation of the guiding sleeve 3. The rotation stopping portions 42 are specifically two, and the two rotation stopping portions 42 are disposed on the end surface of one end of the fixing sleeve 4 and close to the one-way valve ring 2.

In this embodiment, one end of the shell 1 is closed, the other end of the shell 1 is provided with an axial opening communicating with the cavity, an end cap 8 for sealing the axial opening is fixedly connected at the other end of the shell 1. The rotating shaft 5 further includes a hollow second shaft section 53. The threaded section 52 is located between the second shaft section 53 and the first shaft section 51. The free end of the second shaft section 53 extends out of the shell through the end cap 8 for connecting to the toilet lid; a sealing ring 6 is arranged between the second shaft section 53 and the cavity of the shell 1.

In the present embodiment, an annular boss 531 is provided on the outer periphery of the root portion of the second shaft section 53, and the other end of the fixing sleeve 4 is provided with an inner flange abutting against the inner end surface of the annular boss 531, so as to achieve to axially limit fixing sleeve 4. In order to avoid the rotation of the fixing sleeve 4 relative to the shell 1, a slot may be arranged on the outer periphery of the fixing sleeve 4, and correspondingly, a convexity is arranged on the inner wall of the cavity of the shell 1. The sealing ring is sleeved on the outer circumference of the annular boss 531 of the second shaft section 53. The second shaft section 53 is also sleeved with a washer 7, and the washer 7 abuts against between the outer end surface of the annular boss 531 and the inner end surface of the end cap 8. The remaining portion of the second shaft section 53 includes a cylindrical section 532 and a flat section 533. The cylindrical section 532 is located between the annular boss 531 and the flat section 533. The cylindrical section 532 is provided with a circular and axially penetrating through-hole fitting with the end cap 8, so that the rotating shaft 5 can rotate relative to the end cap 8 freely.

Figure 2:
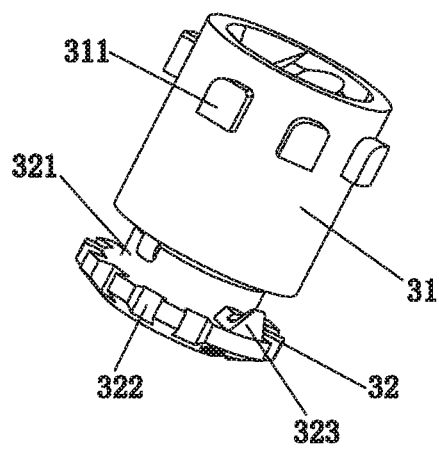
FIG. 2 is a schematic structural view of the guiding sleeve of the present invention.
Figure 3:
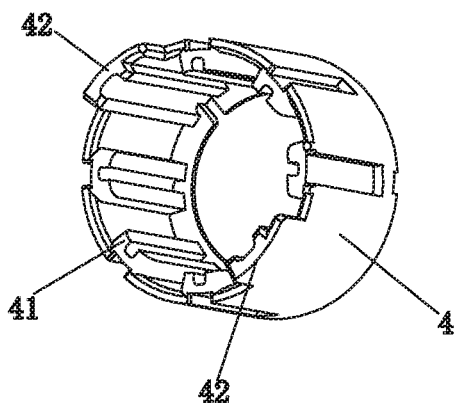
FIG. 3 is a schematic structural view of the fixing sleeve of the present invention.
Figure 4:
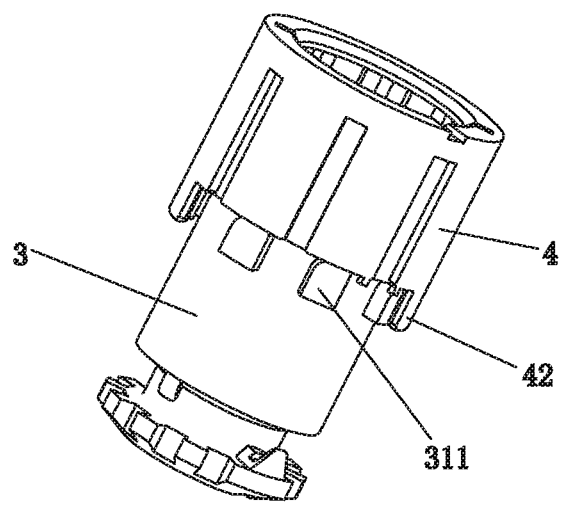
FIG. 4 is a schematic structural view of the guiding sleeve and the fixing sleeve in a disengaged state of the present invention.

When the toilet lid is closed, the state of the present invention is shown in FIG. 5-1 and FIG. 5-2. At this time, the guiding sleeve 3 and the fixing sleeve 4 are engaged with each other, the one-way valve ring 2 is in close contact with the groove wall of the outer end of the annular groove 321 of the guiding sleeve 3 so that the one-way valve passage is in a closed state.

When the toilet lid is turned upwards, the rotating shaft 5 rotates clockwise with the toilet lid as shown in FIG. 6-1. The arrow in the figure indicates the rotating direction of the rotating shaft 5. Because the second convex portion 311 of the guiding sleeve 3 and the first convex portion 41 of the fixing sleeve 4 are engaged with each other and the guiding sleeve 3 is screwed with the rotating shaft 5, the guiding sleeve 3 gradually moves in the direction of disengagement of the second convex portion 311 from the first convex portion 41 of the fixing sleeve 4 (ie, the direction indicated by the straight-line arrow in FIG. 6-2) along with the rotation of the rotating shaft 5. In addition, with the axial movement of the guiding sleeve 3, the damping oil in the first chamber 11 is squeezed and a reaction force is formed on the one-way valve ring 2 so that the one-way valve ring 2 moves to the direction of the second chamber 12, so that the one-way valve ring 2 is gradually released from the outer groove wall of the annular groove 321 of the guiding sleeve 3, which forms a large gap between the one-way valve ring 2 and the annular groove 321 so that the damping oil in the first chamber 11 passes through the oil gap 322 of the guiding sleeve head 32, the gap between the one-way valve ring 2 and the annular groove 321 to flow to the second chamber 12, as shown in FIG. 6-2, the curved arrows in the figure indicate the flow direction of the damping oil. A small portion of the damping oil in the first chamber 11 flows to the second chamber 12 through the oil groove having a smaller cross-sectional area on the first shaft section 51. During this process, the flow of damping oil is smoother, resulting in less opening resistance of the toilet lid.

When the toilet lid is opened to a predetermined angle (70°), the second convex portion 311 of the guiding sleeve 3 and the first convex portion 41 of the fixing sleeve 4 are completely disengaged, as shown in FIGS. 7-1 and 7-2. At this moment, the guiding sleeve 3 no longer moves axially, and the guiding sleeve 3 can rotate with the rotating shaft 5; the damping oil is not exchanged between the first chamber 11 and the second chamber 12, and the rotating shaft 5 can rotate freely. When the toilet lid continues to flip upward, as shown in FIGS. 8-1 and 8-2, the rotating shaft 5 continues to rotate clockwise with the toilet lid, and the rotating shaft 5 rotates freely, and drives the guiding sleeve 3 to rotate together. When the toilet lid is turned up to the position (120°), the state of the present invention is shown in FIGS. 9-1 and 9-2. At this time, the second convex portion 311 of the guiding sleeve 3 and the first convex portion 41 of the fixing sleeve 4 is still completely disengaged from the state, and the two second convex portion 311 of the guiding sleeve 3 respectively abuts against one side of the two rotation stopping portion 42.

When the toilet lid is turned downwards, the rotating shaft 5 rotates counterclockwise, as shown in FIG. 10-1. The arrow in the figure indicates the rotation direction of the rotating shaft 5. In this process, the guiding sleeve 3 rotates with the rotating shaft 5 without damping as shown in FIG. 10-2, so that the toilet lid can be quickly lowered. When the toilet lid is turned downward to the 70° position, the two second convex portion 311 of the guiding sleeve 3 abut against the other side of the two rotation stopping portions 42 to restrict the guiding sleeve 3 from continuing to rotate with the rotating shaft 5. Due to the guiding sleeve 3 is screwed with the threaded portion 52 of the rotating shaft 5, and at the same time, the second convex portion 311 of the guiding sleeve 3 are not aligned with each of the first convex portion 41 of the fixing sleeve 4, so that when the rotating shaft 5 continues to rotate, the guiding sleeve 3 is driven to move axially in the direction of engaging the second convex portion 311 with the first convex portion 41 of the fixing sleeve 4 as shown in FIG. 11-1 and FIG. 11-2. The straight line arrow in the figure indicates the direction of movement of the guiding sleeve 3, so that the toilet lid into the slow fall stage. With the axial movement of the guiding sleeve 3, the outer end groove wall of the annular groove 321 gradually sticks to the one-way valve ring 2 to close the one-way valve passage, and the damping oil in the second chamber 12 passes through the two oil grooves 511,512 on the first shaft section 51, and the gap between the rotating shaft 5 and the guiding sleeve 3 to flow to the first chamber 11, as shown in FIG. 11-2, the curved arrow in the figure indicates the flow direction of the damping oil, this is pre-stage process of the slow down phase of the toilet lid, the speed of slow down is faster.

As the toilet lid continues to flip down, the rotating shaft 5 continues to rotate, the guiding sleeve 3 continues to move axially toward the direction shown by the straight arrow in FIG. 11-2, the one-way valve passage remains closed, and the damping oil in the second chamber 12 pass through the oil groove 512 having a small cross-sectional area on the first shaft section 51, and the gap between the shaft 5 and the guiding sleeve 3 to flow to the first chamber 11, as shown in FIG. 12-1, FIG. 12-2, the straight line arrow in the figure indicates the flow direction of the damping oil, this is the later process of the slow-down stage of the toilet lid, and the slow-down speed is slower.

In other embodiments, the one-way valve passage is closed when the guiding sleeve is moved axially from the disengagement to engagement with the guiding structure and the fluid medium is forced to pass through the gap between the rotating shaft and the guiding sleeve.

In other embodiments, the one-way valve passage is closed when the guiding sleeve is moved axially from the disengagement to engagement with the guiding structure and the fluid medium is forced to pass through the gap between the shell and the guiding sleeve.

In other embodiments, the one-way valve passage is closed as the guiding sleeve is moved axially from the disengagement to engagement with the guiding structure, the fluid medium is forced pass through the gap between the rotating shaft and the guiding sleeve, and the gap between the guiding sleeve and the shell.

In other embodiments, the one-way valve passage is closed as the guiding sleeve is moved axially from the disengagement to engagement with the guiding structure, the fluid medium is forced to pass through the gap between the shaft and the guiding sleeve, and the damping passage provided on the rotating shaft.

In other embodiments, the one-way valve passage is closed as the guiding sleeve is moved axially from the disengagement to engagement with the guiding structure, the fluid medium is forced to pass through the gap between the shell and the guiding sleeve, and the damping passage provided on the rotating shaft.

In other embodiments, the one-way valve passage is closed as the guiding sleeve is moved axially from the disengagement to engagement with the guiding structure, the fluid medium is forced to pass through the gap between the rotating shaft and the guiding sleeve, the gap between the guiding sleeve and the shell, and the damping passage provided on the rotating shaft.

In other embodiments, the damping passage is one and the cross-sectional area is gradually changed. After the one-way valve passage is closed, the fluid medium is forced to pass through the portion having a large cross-sectional area and then passes through the portion having a small cross-sectional area.

In other embodiments, a plurality of oil holes axially passing through the annular groove are arranged at intervals on the end of the guide sleeve.

In other embodiments, the end of the guiding sleeve is provided with the oil gap or the oil hole, and when the one-way valve passage is opened, the damping oil of the first chamber passes through the gap between the guiding sleeve and the shell and the gap between the one-way valve ring and the annular groove to flow to the second chamber.

In other embodiments, the guiding structure and the rotation stopping portion are directly formed on the inner wall of the shell.

In other embodiments, the shaft of the present invention is attached to the toilet seat and the shell is attached to the toilet lid.

In other embodiments, the damper of the present invention is applied to other equipment, for example to a piano, for allowing the piano cover to open quickly and close slowly.

The above embodiments are merely used to further illustrate a damper according to the present invention. However, the present invention is not limited to the embodiments. Any simple modifications, equivalent changes and modifications made to the above embodiments according to the technical essence of the present invention will be into the protection scope of the technical scheme of the present invention.

INDUSTRIAL PRACTICABILITY

By designing the clutch structure of the rotating shaft and the guiding sleeve, the invention can quickly fall firstly and then slowly fall when the pivoting member is closed, and can greatly shorten the closing time of the pivoting member as a whole to meet the user's requirement of use.

The invention claimed is:

1. A damper, comprising:
a shell,
a rotation shaft, and
a guiding sleeve, wherein:
the shell is connected to one of a pivoting member or a fixed seat,
the shell comprises a cavity containing a viscous fluid medium,
the rotation shaft is connected to the other of the pivoting member or the fixed seat,
the rotation shaft is rotatably disposed in the cavity,
a first the portion of the rotation shaft disposed in the cavity comprises an external thread,
the guiding sleeve comprises an internal thread,
the guiding sleeve is configured to reciprocate in the cavity in an axial direction of the cavity,
the internal thread of the guiding sleeve is screwed to the external thread of the rotation shaft,
a guiding structure for guiding axial movement of the guiding sleeve is disposed in the cavity,
the guiding sleeve is engaged with or disengaged from the guiding structure through the axial movement of the guiding sleeve,
when the guiding sleeve is disengaged from the guiding structure, the guiding sleeve is configured to rotate relative to the rotation shaft,
the guiding sleeve comprises a one-way valve passage,
when the guiding sleeve moves in the axial direction of the cavity to switch the guiding sleeve from being engaged with the guiding structure being disengaged from the guiding structure, the one-way valve passage is open so that the viscous fluid medium passes through the one-way valve passage, and
when the guiding sleeve moves in the axial direction of the cavity to switch the guiding sleeve from being disengaged from the guiding structure to being engaged with the guiding structure, the one-way valve passage is close so that the viscous fluid medium is forced to pass through at least one of:
a first gap between the rotation shaft and the guiding sleeve,
a second gap between the guiding sleeve and the shell, or
at least one damping passage disposed on the rotation shaft.

2. The damper according to claim 1, wherein:
the guiding sleeve sequentially comprises a guiding sleeve head and a guiding sleeve body,
the guiding sleeve body comprises the internal thread, and
the guiding sleeve head comprises the one-way valve passage.

3. The damper according to claim 2, wherein:
the one-way valve passage comprises an annular groove and a one-way valve ring,
an outer periphery of the guiding sleeve head comprises the annular groove,
the one-way valve ring surrounds the annular groove and is configured to move in the annular groove in an axial direction of the guiding sleeve head,
an outer periphery of the one-way valve ring is flexibly coupled to an inner wall of the cavity in a sealing manner, and
after the one-way valve passage is closed, the viscous fluid medium is forced to pass through at least one of the first gap between the rotation shaft and the guiding sleeve head or the at least one damping passage disposed on the rotation shaft.

4. The damper according to claim 1, wherein:
the first portion of the rotation shaft comprises a threaded section comprising the external thread and a first rotation shaft section comprising the at least one damping passage, and
an axis of the threaded section and an axis of the first rotation shaft section are coaxial.

5. The damper according to claim 4, wherein:
the at least one damping passage comprises at least two oil passing grooves or the at least one damping passage only comprises a single oil passing groove,
when the at least one damping passage comprises at least two oil passing grooves:

the at least two oil passing grooves are respectively disposed on a side wall of the rotation shaft in an axial direction of the rotation shaft, and after the one-way valve passage is closed, the viscous fluid medium is forced to firstly pass through each of the at least two oil passing grooves and then pass through a subset of the at least two oil passing grooves, and when the at least one damping passage comprises a single oil passing groove:

a cross-sectional area of the single oil passing groove changes gradually, after the one-way valve passage is closed, the viscous fluid medium is forced to firstly pass through a first section of the single oil passing groove comprising a first cross-sectional area and then to pass through a second section of the single oil passing groove comprising a second cross-sectional area, and the first cross-sectional area is larger than the second cross-sectional area.

6. The damper according to claim 5, wherein when the at least one damping passage comprises at least two oil passing grooves:

a length of each of the at least two oil passing grooves is not equal, a cross-sectional area of a first oil passing groove of the at least two oil passing grooves is smaller than a cross-sectional area of a second oil passing groove of the at least two oil passing grooves, a length of the first oil passing groove is longer than a length of the second oil passing groove, and after the one-way valve passage is closed, the viscous fluid medium is forced to firstly pass through each of the at least two oil passing grooves and then pass through the first oil passing groove.

7. The damper according to claim 1, wherein:

at least one rotation stopping portion is further disposed in the cavity, and when the guiding sleeve is rotated to a predetermined angle during a rotation of the rotation shaft, rotation of the guiding sleeve is restricted by the rotation stopping portion.

8. The damper according to claim 7, wherein:

a fixed sleeve is fixedly disposed in the cavity, the guiding sleeve is disposed in the fixed sleeve, the guiding structure comprises a plurality of first convex portions annually disposed on an inner wall of the fixed sleeve at intervals, an outer wall of the guiding sleeve is annually disposed with a plurality of second convex portions at intervals, the plurality of first convex portions is engaged with or disengaged from the second plurality of convex portions;

the rotation stopping portion is disposed on the fixed sleeve, and when the guiding sleeve is rotated to the predetermined angle along with the rotation of the rotation shaft, the rotation stopping portion abuts the plurality of second convex portions to prevent the guiding sleeve from rotating.

9. The damper according to claim 3, wherein:

a first end of the guiding sleeve head comprises a plurality of oil passing gaps or a plurality of oil passing holes disposed in a direction of the guiding sleeve head at intervals, and the plurality of oil passing gaps or the plurality of oil passing holes run through the annular groove.

10. The damper according to claim 4, wherein:

a first end of the shell is closed, a second end of the shell comprises an opening, the opening is disposed in an axial direction of the shell and is in fluid communication with the cavity, the second end of the shell is fixedly connected to an end cap configured to seal the opening, the rotation shaft further comprises a second rotation shaft section, the threaded section is disposed between the second rotation shaft section and the first rotation shaft section, and a free end of the second rotation shaft section extends out from the shell through the end cap to enable the free end to be connected to the pivoting member and the fixing seat.

11. A damper, comprising:

a shell, a rotation shaft, and a guiding sleeve, wherein:

the shell is connected to one of a pivoting member or a fixed seat, the shell comprises a cavity containing a viscous fluid medium, the rotation shaft is connected to the other of the pivoting member or the fixed seat, the rotation shaft is rotatably disposed in the cavity, a first portion of the rotation shaft disposed in the cavity comprises an external thread, the guiding sleeve comprises an internal thread, the guiding sleeve is configured to reciprocate in the cavity in an axial direction of the cavity, the internal thread of the guiding sleeve is screwed to the external thread of the rotation shaft, a guiding structure for guiding axial movement of the guiding sleeve is disposed in the cavity, the guiding sleeve is engaged with or disengaged from the guiding structure through the axial movement of the guiding sleeve, the guiding sleeve comprises a one-way valve passage, the one-way valve passage comprising a one-way valve ring, the one-way valve ring divides the cavity into a first chamber and a second chamber, when the guiding sleeve is disengaged from the guiding structure, the guiding sleeve is configured to rotate relative to the rotation shaft, when the pivoting member is turned upward:

the guiding sleeve is engaged with the guiding structure, the guiding sleeve is screwed to the rotating shaft, when the rotating shaft rotates, the guiding sleeve moves in an axial direction of the guiding sleeve to enable the one-way valve ring to leave a closed position of the one-way valve passage, and a gap between the first chamber and the second chamber becomes larger gradually, when the pivoting member is opened to a predetermined angle:

the guiding sleeve is disengaged from the guiding structure, the guiding sleeve is inhibited from moving in the axial direction of the guiding sleeve, and the gap between the first chamber and the second chamber is maintained, when the pivoting member is dropped:
before the pivoting member is rotated to the predetermined angle:
the guiding sleeve is disengaged from the guiding structure, and
the gap between the first chamber and the second chamber is maintained,
after the pivoting member is rotated the predetermined angle:
the guiding sleeve is engaged with the guiding structure,
the guiding sleeve is screwed to the rotating shaft,
when the rotating shaft rotates, the guiding sleeve moves in the axial direction of the guiding sleeve to enable the one-way valve ring to move away from an open position of the one-way valve passage, and
the gap between the first chamber and the second chamber becomes smaller gradually.

12. The damper according to claim 11, wherein:
the guiding structure is a fixed sleeve, and
the guiding structure is disposed in the shell.

13. The damper according to claim 11, wherein the damper is coupled to a toilet lid and is configured to dampen the toilet lid.

14. The damper according to claim 2, wherein:
the first portion of the rotation shaft comprises a threaded section comprising the external thread and a first rotation shaft section comprising the at least one damping passage, and
an axis of the threaded section and an axis of the first rotation shaft section are coaxial.

15. The damper according to claim 3, wherein:
the first portion of the rotation shaft comprises a threaded section comprising the external thread and a first rotation shaft section comprising the at least one damping passage, and
an axis of the threaded section and an axis of the first rotation shaft section are coaxial.

16. The damper according to claim 14, wherein:
the at least one damping passage comprises at least two oil passing grooves or the at least one damping passage only comprises a single oil passing groove,
when the at least one damping passage comprises at least two oil passing grooves:
the at least two oil passing grooves are respectively disposed on a side wall of the rotation shaft in an axial direction of the rotation shaft, and
after the one-way valve passage is closed, the viscous fluid medium is forced to firstly pass through each of the at least two oil passing grooves and then pass through a subset of the at least two oil passing grooves, and
when the at least one damping passage comprises a single oil passing groove:
a cross-sectional area of the single oil passing groove changes gradually,
after the one-way valve passage is closed, the viscous fluid medium is forced to firstly pass through a first section of the single oil passing groove comprising a first cross-sectional area and then to pass through a second section of the single oil passing groove comprising a second cross-sectional area, and
the first cross-sectional area is larger than the second cross-sectional area.

17. The damper according to claim 15, wherein:
the at least one damping passage comprises at least two oil passing grooves or the at least one damping passage only comprises a single oil passing groove,
when the at least one damping passage comprises at least two oil passing grooves:
the at least two oil passing grooves are respectively disposed on a side wall of the rotation shaft in an axial direction of the rotation shaft, and
after the one-way valve passage is closed, the viscous fluid medium is forced to firstly pass through each of the at least two oil passing grooves and then pass through a subset of the at least two oil passing grooves, and
when the at least one damping passage comprises a single oil passing groove:
a cross-sectional area of the single oil passing groove changes gradually,
after the one-way valve passage is closed, the viscous fluid medium is forced to firstly pass through a first section of the single oil passing groove comprising a first cross-sectional area and then to pass through a second section of the single oil passing groove comprising a second cross-sectional area, and
the first cross-sectional area is larger than the second cross-sectional area.

18. The damper according to claim 16, wherein when the at least one damping passage comprises at least two oil passing grooves:
a length of each of the at least two oil passing grooves is not equal,
a cross-sectional area of a first oil passing groove of the at least two oil passing grooves is smaller than a cross-sectional area of a second oil passing groove of the at least two oil passing grooves,
a length of the first oil passing groove is longer than a length of the second oil passing groove, and
after the one-way valve passage is closed, the viscous fluid medium is forced to first pass through each of the at least two oil passing grooves and then pass through the first oil passing groove.

19. The damper according to claim 17, wherein when the at least one damping passage comprises at least two oil passing grooves:
a length of each of the at least two oil passing grooves is not equal,
a cross-sectional area of a first oil passing groove of the at least two oil passing grooves is smaller than a cross-sectional area of a second oil passing groove of the at least two oil passing grooves,
a length of the first oil passing groove is longer than a length of the second oil passing groove, and
after the one-way valve passage is closed, the viscous fluid medium is forced to firstly pass through each of the at least two oil passing grooves and then pass through the first oil passing groove.

20. The damper according to claim 14, wherein:
a first end of the shell is closed,
a second end of the shell comprises an opening,
the opening is disposed in an axial direction of the shell and is in fluid communication with the cavity,
the second end of the shell is fixedly connected to an end cap configured to seal the opening,
the rotation shaft further comprises a second rotation shaft section,
the threaded section is disposed between the second rotation shaft section and the first rotation shaft section, and a free end of the second rotation shaft section extends out from the shell through the end cap to enable the free end to be connected to the pivoting member and the fixing seat.

21. The damper according to claim 15, wherein:
a first end of the shell is closed,
a second end of the shell comprises an opening,
the opening is disposed in an axial direction of the shell and is in fluid communication with the cavity,
the second end of the shell is fixedly connected to an end cap configured to seal the opening,
the rotation shaft further comprises a second rotation shaft section,
the threaded section is disposed between the second rotation shaft section and the first rotation shaft section, and
a free end of the second rotation shaft section extends out from the shell through the end cap to enable the free end to be connected to the pivoting member and the fixing seat.

* * * * *